(No Model.)

J. T. RIDER.
COUNTERSINKING SCREW.

No. 388,000. Patented Aug. 14, 1888.

WITNESSES:
John B. Taft.
J. Whitney Beals Jr.

INVENTOR:
John T. Rider
By Wm. Robinson,
Attorney.

UNITED STATES PATENT OFFICE.

JOHN T. RIDER, OF SOUTH OIL CITY, PENNSYLVANIA, ASSIGNOR OF ONE-HALF TO CHARLES H. DUNCAN, OF SAME PLACE.

COUNTERSINKING-SCREW.

SPECIFICATION forming part of Letters Patent No. 388,000, dated August 14, 1888.

Application filed December 19, 1887. Serial No. 258,298. (No model.)

*To all whom it may concern:*

Be it known that I, JOHN T. RIDER, a citizen of the United States, residing at South Oil City, in the county of Venango and State of Pennsylvania, have invented a new and useful Countersinking-Screw, of which the following is a specification.

The object of my invention is to produce a screw provided with grooves or notches or cutting or grinding edges on the under side of its head, adapting said screw to countersink its own way any depth desired into wood.

My invention consists of a screw constructed as above described.

Figure 1:
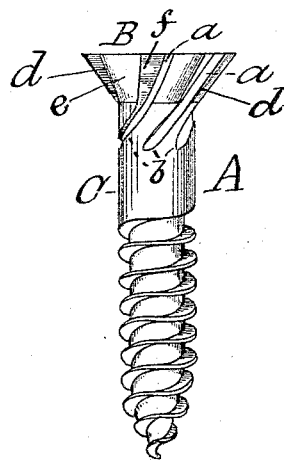
Figure 2:
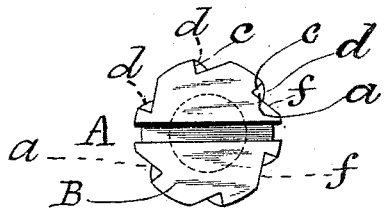

Referring to the accompanying drawings, which form a part of this specification, Figure 1 is an elevation of a screw illustrating my invention, and Fig. 2 is a plan view of the same.

Similar letters of reference indicate corresponding parts in both figures.

The screw A has the under side of its beveled head B provided with diagonal or spiral grooves $a$, preferably extending somewhat down the shank C, as shown at $b$, Fig. 1. One face, $c$, of the groove $a$ forms approximately a right angle with the bevel $e$ of the screw-head, thus leaving the sharp angle or cutting-edge $d$ on the surface of said bevel. The opposite face, $f$, of said groove $a$ is beveled or cut away, as shown.

The beveled or under side, $e$, of the screw-head is provided with several of these grooves and cutting-edges.

The grooves $a$ traverse the beveled screw-head and the shank, as shown, in the direction of right-hand screw-threads, but may extend in any direction adapted to accomplish the desired result.

The operation is as follows: The screw A is forced into the wood with a screw-driver in the usual manner. When the head B reaches the wood, the edges $d$ of the grooves $a$ cut or grind away the wood, and the dust thus produced is carried up through the grooves $a$ and discharged above the head of the screw. Thus it will be seen the turning of the screw cuts or countersinks a smooth hole into the wood just the size of the screw-head. In this way the screw-head is left flush with the surface of the wood or sunk below the surface to any depth desired, leaving a smooth round hole above the screw-head. This screw countersinks its way into soft or hard wood with equal facility, making a perfectly smooth hole. When the screw-head is sunk flush with the surface of the wood, the grooves $a$ are not perceptible and as smooth a surface is left as when the ordinary screw is used. Furthermore, when the screw-head is countersunk deeply into the wood, as described, the smooth hole above it may be neatly plugged with wood or putty or any other suitable substance, thus making a smooth and finished job.

It will be observed that in using my screw plug-bits and countersinks of all kinds are dispensed with, the screw-head doing its own countersinking in all cases, a screw-driver alone being necessary to drive it any desired depth into solid wood. In simplicity and convenience, therefore, this screw is without a parallel, and is not only of great value for the use of cabinet-makers and in all fine work, but is of equal convenience and value in coarse work and in all cases where it is necessary to use bevel-headed screws.

In the drawings the grooves $a$ are shown as extending somewhat down the shank C. This is a convenience, but not an essential feature of my invention. The screw will countersink its way with perhaps equal facility when the grooves $a$ do not extend beyond the head of the screw and when said grooves are in planes passing through the vertical center line of the screw. These are modifications in detail, which do not affect the essential features of my invention.

Having thus described my invention, what I claim as new, and desire to secure by Letters Patent, is—

1. A bevel-headed screw having the under or beveled side of its head provided with one or more grooves extending from the top to the bottom of the beveled surface of said head, said grooves continuing some distance down the smooth stem of said screw and terminating in said stem below the head of said screw, substantially as and for the purpose described.

2. A screw having the under side of its head provided with one or more slots or grooves extending diagonally across the under surface of said screw-head and across a portion of the smooth surface of the stem of said screw, and terminating in said stem below the head of said screw, one side of said grooves or slots being provided with cutting or grinding edges, whereby when said screw is screwed into wood said cutting-edges will countersink a place for the head of said screw, substantially as set forth.

3. The screw A, having the under side e of its head provided with a groove and a cutting or grinding edge, said groove extending below said screw-head and along the stem C of said screw, and gradually running out and terminating on said stem C, substantially as shown and described.

JOHN T. RIDER.

Witnesses:
C. A. COOPER,
HUGH C. GRAHAM.